Patented Aug. 1, 1950

2,517,093

UNITED STATES PATENT OFFICE 2,517,093

PYRIDINIUM DERIVATIVES OF PHENOXYALKANOL ESTERS

Melvin De Groote, University City, and Bernhard Keiser, Webster Groves, Mo., assignors to Petrolite Corporation, Ltd., Wilmington, Del., a corporation of Delaware No Drawing. Original application April 2, 1945, Serial No. 586,262. Divided and this application November 26, 1945, Serial No. 630,977

9 Claims. (Cl. 260—295)

This invention relates to a new chemical product or compound and to the manufacture of same, our present application being a division of our pending application Serial No. 586,262, filed April 2, 1945, now Patent No. 2,429,996.

One object of our invention is to provide a new material or composition of matter, that is particularly adapted for use as a demulsifier in the resolution of crude oil emulsions, but which is also capable of use for various other purposes, or in various other arts.

Another object of our invention is to provide a practicable method for manufacturing or producing the new material or composition of matter above referred to.

The new material or composition of matter herein described consists of a hydrophile pyridine compound of the formula:

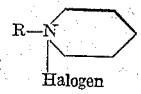

in which R is the radical obtained by the removal of an alpha-hydrogen atom from the acid radical of a low molecular weight mono-carboxy acid ester of a phenoxyalkanol of the formula:

$$R_1O(R_2O)_nH$$

in which $R_1$ is a monocyclic phenyl radical having at least 2 and not more than 3 alkyl side chains, at least 2 of which contain at least 4 carbon atoms and the longest of which does not contain more than 8 carbon atoms, with the proviso that the number of carbon atoms in all the side chains must total at least 9; $R_2O$ is an alkoxy radical selected from the class consisting of —$C_2H_4O$— and —$C_3H_6O$— radicals; and $n$ is a small whole number varying from 1 to 3, or even 4 or 5, or more—for instance, 6. More specifically, the ester derived from a phenoxyalkanol includes alkanols in which the carbon atom chain is interrupted at least once by oxygen; i. e., etheralkanols or etheralcohols. Thus, R, in the first formula of the text, represents the monovalent radical by elimination of halogen from the ester of the formula:

$$R_1O(R_2O)_nOC.R_3 \text{ Halogen}$$

in which all the symbols have their prior significance, and $OCR_3$ Halogen is the acyl radical of a low molecular weight alpha-choromonocarboxy acid, such as chloroacetic acid. In other words, repeating the previous example with specific reference to chloroacetic acid, the formula becomes:

$$R_1O(R_2O)_nOC.CH_2Cl$$

Briefly stated, the preparation of our new material or composition of matter contemplates three steps: In the first step a properly selected phenol of the kind typified by the formula $R_1OH$ is treated with 1 to 3 moles or even 4 or 5 moles of an oxyalkylating agent of the kind described, or, at least sufficient to insure at least incipient hydrophile properties in the final compound, so as to produce a phenoxyalkanol; employing ethylene oxide as an example, the reaction may be illustrated in the following manner:

$$R_1OH + C_2H_4O \rightarrow R_1OC_2H_4OH$$

The second step consists in esterifying the alcohol thus obtained with a suitable alpha-chloromonocarboxy acid, such as chloroacetic acid, so as to form the corresponding ester. This reaction may be illustrated in the following manner:

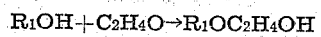

The third or final step consists in reacting the ester so obtained with pyridine, or one of its homologs, as subsequently specified. Such reaction may be shown in the following manner:

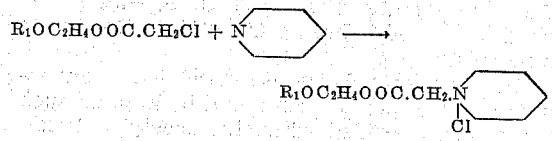

As suggested, one may not only use pyridine, but other homologs of pyridine, that is, members of the pyridine series. For instance, members of the pyridine series suitable as reactants include pyridine and methylated pyridines, i. e., pyridines, in which 1, 2, or 3 methyl groups have been substituted in the nucleus, such as picolines, lutidines and collidines. Coal tar bases represent mixtures of suitable heterocyclic materials which may be used as such, or after suitable purification, without separation into the individual components.

While chloroacetic acid or chloroacetyl chloride is the preferred halogen carboxylic acid compound, other halogen acids, halogen-substituted acyl halides, and esterifying derivatives are suitable, particularly a-halogen carboxylic acids of not over three carbon atoms. When the halogen is in the a-position to the CO group, the reaction seems to go with greater readiness. With the shorter chain esterifying halogen carboxylic acids or their functional equivalents, especially chloroacetyl chloride, the reaction goes with great ease. Other halogen acylating compounds which are suitable are, for example, a-chloropropionic acid, etc., but especially any acid of the formula:

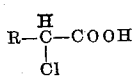

where R is a hydrogen atom or a methyl radical.

Substituted phenols of the kind contemplated for reaction, in preparation of the herein described compounds, include, among other, di(tertiary) amylphenol, diheptylphenol; dioctylphenol (di-diisobutylphenol); 2,3-dimethyl-4-6-di-tert-butylphenol; 2-ethyl-4,6-di - tert - butylphenol; 2-methyl-4,6-di-tert-butylphenol; 3-ethyl-4,6 di-tert-butylphenol; 4 - ethyl - 2,6 - di - tert - butylphenol; 4 - methyl - 2,6-di-tert-amylphenol; and 2,4,6-tri-tert-butylphenol.

Treatment of water-insoluble phenols with alkylene oxides of the kind enumerated, i. e., with ethylene oxide and propylene oxide, is a well-known procedure. Such compounds are frequently oxyethylated so as to render them water-soluble. In the present instance instead of treating one mole of the selected phenol with a large ration of oxyalkylating agent, one employs instead a comparatively low ratio, as indicated by the value for the letter $n$ in prior formulae. In other words, one treats the phenol with 1 mole, 2 moles, or 3 moles, or even more moles of the oxyalkylating agent. The product so obtained is still distinctly water-insoluble to the extent that it will not yield a sol or solution, and this is also true of the ester derived therefrom. The ester is invariably even less water-soluble. It is to be noted, however, that such water-insoluble, or partially soluble, product represents the initial oxyalkylation step in the same type of procedure employed to produce a water-soluble product, or, at least, a product of distinctly hydrophile properties. Thus, as an example of various patents which teach the oxyalkylation of water-insoluble phenols including the stepwise addition of the oxyalkylating agent, attention is directed to the following: British Patent No. 470,181, British Patent No. 452,866, U. S. Patent No. 2,243,330, dated May 27, 1941, to De Groote and Keiser, and U. S. Patent No. 2,233,381, dated February 25, 1941, to De Groote and Keiser.

Having obtained a water-insoluble phenoxyalkanol, or one that is somewhat hydrophile, such product is esterified with chloroacetyl chloride, chloroacetic acid, bromoacetic acid, alpha-chloropropionic acid, or the like. Such reaction, particularly between the acid itself, as differentiated from the acylchloride, is simply an esterification reaction, with the elimination of water, and is preferably carried out in the presence of an inert solvent insoluble in water, which serves to remove the water of formation. Such procedure is illustrated by numerous patents, including the following: British Patent No. 500,765; U. S. Patent No. 1,732,392, dated October 22, 1929, to Wietzel, and U. S. Patent No. 2,264,759, dated December 2, 1941, to Jones.

Having obtained the ester, it is reacted with pyridine or a pyridine homolog. This reaction takes place readily by merely refluxing, in the presence of an excess of pyridine, and subsequently removing the excess of pyridine which does not enter the reaction by distillation and preferably vacuum distillation. The herein described procedures are illustrated by the following examples:

PHENOXYALKANOL

*Example 1*

One pound mole of tri-isobutylphenol

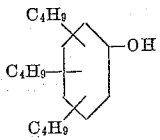

is treated with 44 pounds of ethylene oxide in the presence of approximately three-fourths of a pound of suspended sodium methylate. As the reaction proceeds, the sodium methylate either dissolves or is converted into a soluble compound by chemical combination. Reaction is conducted at approximately 125° C. and 100–250 pounds gauge pressure for approximately an hour and a half to two and one-half hours, until the reaction appears to be complete, as evidenced by the pressure dropping to zero.

PHENOXYALKANOL

*Example 2*

One pound mole of the phenoxyalkanol described in the preceding example is reacted with an additional portion of ethylene oxide (approximately 44 pounds) and this reaction is conducted at approximately 110° C. with a gauge pressure of approximately 100 pounds, until all of the ethylene oxide is absorbed. Time required for reaction is approximately the same as required in previous example.

PHENOXYALKANOL

*Example 3*

The same procedure is repeated as in the prior example, except that 2 pound moles of ethylene oxide, to wit, 88 pounds, are employed and the period of time required to complete the reaction may vary from approximately 1 hour to about 3 hours. Further oxyethylation, for instance, the use of another 88 pounds of ethylene oxide, may be required to give a distinct hydrophile effect in the final compound.

PHENOXYALKANOL

*Example 4*

One pound mole of 2,4-di(tertiary) amylphenol is reacted in the same manner as in the 3 prior examples, with ethylene oxide, so as to produce compounds having the following composition:

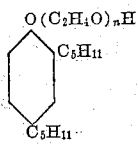

in which $n$ varies from 1 to 3.

PHENOXYALKANOL

*Example 5*

The same procedure is followed as in the preceding five examples, except that propylene oxide is substituted for ethylene oxide. As suggested by the patents previously referred to in regard to oxyethylation, such less active oxyalkylating agent requires a somewhat higher temperature, for instance, a maximum of 200° C. and a somewhat higher pressure, for instance, a maximum of 300 pounds, and a somewhat longer period of reaction, for instance, approximately twice the period of time required for ethylene oxide.

Previous reference has been made to the fact that the esterification step is carried out in the conventional manner, preferably in the presence of an inert solvent. This simply means that the reactants, to wit, the acid, such as chloroacetic acid, and the phenoxyalkanol, are mixed in equimolar proportions, in the presence of a solvent in which both are soluble, such as xylene, cymene, decalin, or the like. The mixture is refluxed at some suitable temperature, above 100° C. and below 200° C., so that water of formation resulting from the esterification reaction is carried over as a constant boiling mixture. Such mixed vapor is condensed in the customary manner, so the water is trapped off, measured and then discarded and the solvent returned to the reaction vessel for further use. Ordinarily, such reactions are catalyzed by the addition of an acidic catalyst, such as toluene sulfonic acid, a cresyl phosphoric acid, dry hydrochloric acid, trichloroacetic acid, or the like. Insofar that the alpha-chlorocarboxy acids show marked acidity, in comparison with the unchlorinated carboxy acids, the reaction may be conducted without an added catalyst, if desired, or in the presence of an added catalyst, such as one-half percent to 1% of toluene sulfonic acid. Such catalyst tends to discolor the final product, but this is often immaterial, as, for example, when the product is used as a demulsifier. The entire procedure is too well known to require further elaboration, but is illustrated by the following examples:

ESTER

Example 1

One pound mole of the phenoxyalkanol described in "Phenoxyalkanol, Example 1," preceding, is mixed with one pound mole of alpha-chloroacetic acid and the mixture refluxed with an appropriate trap for the removal of one pound mole of water at a temperature of approximately 155° C. to 225° C. The time required is usually 3 to 10 hours. The resultant is a dark colored liquid.

ESTER

Example 2

The same procedure is followed as in the preceding example, except that phenoxyalkanols, exemplified by "Phenoxyalkanol, Examples 2 to 5," inclusive, are substituted for the phenoxyalkanol employed in the preceding example.

ESTER

Example 3

The same procedure is employed as in the two preceding examples, except that a-chloropropionic acid is substituted for alpha-chloroacetic acid.

ESTER

Example 4

Chloroacetylchloride is substituted for the chloroacetic acide in Ester, Example 1. The reaction starts to take place rapidly between 45° C. and 80° C. and the temperature should be controlled so the reaction takes place at the lowest suitable temperature. The acyl chloride should be added slowly to the phenoxyalkanol, with constant and vigorous agitation. Hydrochloric acid is formed and should be vented and disposed of in a suitable manner. If the reaction does not take place promptly, the temperature should be raised moderately, for instance, 5° to 15° C., or a bit higher, until the reaction proceeds smoothly. However, as soon as the reaction does start, the temperature should be lowered until the reaction proceeds at the slowest feasible rate. Generally, this means use of proper cooling devices, or controlled slow addition of the acyl chloride. Completeness of the reaction can be determined in any suitable manner, such as a check on the amount of hydrochloric acid eliminated, or the drop in hydroxyl value of the reactant mixture. When the reaction is complete, any hydrochloric acid gas dissolved in the reaction mass should be eliminated by passing an inert gas, such as carbon dioxide, through the mixture.

Having obtained an ester of the kind exemplified by the previous examples, or the bromo derivative instead of the chloro derivative, the next step simply involves reaction with pyridine or a pyridine homolog of the kind previously described. The reaction takes place fairly rapidly, and usually is complete within four to 20 hours, particularly if an excess of pyridine is employed. The esters previously described are invariably viscous or semi-solid masses, which are soluble in pyridine without difficulty.

QUATERNARY PYRIDINIUM HALIDE

Example 1

One pound mole of the ester described in "Ester, Example 1," preceding, is refluxed with constant stirring, with several pound moles of technically pure pyridine. The reaction is conducted from approximately 4 to 20 hours, at a temperature in excess of 115° C., or thereabouts, until reaction is complete. Completeness of the reaction can be determined by distilling the uncombined pyridine from a sample and noting, by difference, percentage of pyridine which has been combined. Another suitable test is the determination of ionizable halogen, for instance, chlorine. It is to be noted that the reaction converts a non-ionizable halogen atom to an ionizable atom. When the reaction is complete, the excess of pyridine is removed by continuing the stirring and employing vacuum, so as to give a substantially solid or highly viscous, dark-colored mass. This reaction product should show distinct hydrophile properties.

QUATERNARY PYRIDINIUM HALIDE

Example 2

The same procedure is followed as in Example 1, preceding, except an ester exemplified by "Ester, Example 2" and "Ester, Example 3," preceding, is substituted for the ester employed in the previous example.

QUATERNARY PYRIDINIUM HALIDE

Example 3

The same procedure is followed as in immediately preceding Examples 1 and 2, but instead of using technically pure pyridine, one employs a commercial pyridine, in which there is present some monomethylpyridine and dimethylpyridine, in addition to unsubstituted pyridine.

The new materials or compositions of matter herein described, are useful as wetting, detergent and leveling agents in the laundry, textile, and dyeing industries; as wetting agents and detergents in the acid washing of fruit, in the acid washing of building stone and brick; as a wetting agent and spreader in the application of asphalt in road building and the like; as a constituent of soldering flux preparations; as a flotation reagent in the flotation separation of various minerals; for flocculation and coagulation of various aqueous suspensions containing negatively charged particles, such as sewage, coal washing waste water, and various trade wastes, and the like; as germicides, insecticides, emulsifiers for cosmetics, spray oils, water-repellent textile finish, etc. These uses are by no means exhaustive, as far as industrial application goes, although the most important use of our new material is as a demulsifier for water-in-oil emulsions, and more specifically, emulsions of water or brine in crude petroleum.

We have found that the chemical compounds herein described, which are particularly desirable for use as demulsifiers, may also be used as a break inducer in doctor treatment of the kind intended to sweeten gasoline. (See U. S. Patent No. 2,157,223, dated May 9, 1939, to Sutton.)

Chemical compounds of the kind herein described are also of value as surface tension depressants in the acidization of calcerous oil-bearing strata by means of strong mineral acid, such as hydrochloric acid. Similarly, some members are effective as surface tension depressants, or wetting agents, in the flooding of exhausted oil-bearing strata.

As to using compounds of the kind herein described as flooding agents for recovering oil from subterranean strata, reference is made to the proceduce described in detail in U. S. Patent No. 2,226,119, dated December 24, 1940, to De Groote and Keiser. As to using compounds of the kind herein described as demulsifiers, or in particular as surface tension depressants, in combination with mineral acid or acidization of oil-bearing strata, reference is made to U. S. Patent No. 2,233,383, dated February 25, 1941, to De Groote and Keiser.

The new compounds herein described are of utility, not only for the purposes specifically enumerated in detail, but they also find application in various other industries, processes, and for various uses where wetting agents of the conventional type are used. As to some of such additional uses which are well known, see "The Expanding Application of Wetting Agents," Chemical Industries, volume 48 page 324 (1941).

Another use for the compounds herein contemplated is in the prevention of landslides, as described in U. S. Patent No. 2,348,458, dated May 9, 1944, to Endersby.

Reference is made to the fact that the materials, compounds or products herein contemplated are hydrophile in nature, and may vary from self-emulsifiable products through the range that gives a colloidal sol, and into the final range of products which give clear solutions. Obviously, as the number of side chains in the phenolic nucleus increases, and as their length increases, the hydrophobic character both of the phenol and subsequent derivatives have been increased. If the pyridinium compound obtained from any particular experiment does not show significant hydrophile character, then such hydrophile character can be obtained by the very simple expedient of increasing the repetitious ether linkage, and particularly, by using ethylene oxide in preference to propylene oxide. Everything else being equal, the fewer the alkyl side chains, the shorter the length of the alkyl side chains, the lower the molecular weight of the alpha-chloromonocarboxy acid radical, and the lower the molecular weight of the pyridine type of compound, the greater the hydrophile effect. With these obvious factors in mind, there is no difficulty in obtaining a compound having at least distinct hydrophile properties, and it may, in fact, as noted, be completely water-soluble.

Attention is directed to our co-pending applications for patent Serial Nos. 586,262, 586,263, 586,266 and 586,267, all filed Apr. 2, 1945 and all issued November 4, 1947, as Patents Nos. 2,429,996; 2,429,997; 2,430,000 and 2,430,001, respectively, and applications Serial Nos. 630,973 and 630,974, filed November 26, 1945.

Having thus described our invention, what we claim as new and desire to secure by Letters Patent is:

1. A hydrophile chemical compound of the formula:

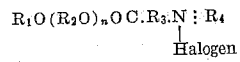

in which $R_1$ is a monocyclic phenyl radical having at least 2 and not more than 3 alkyl side chains, of which at least 2 contain at least 4 carbon atoms; the longest side chain of the nucleus $R_1$ shall not contain more than 8 carbon atoms, with the proviso that the number of carbon atoms in all the side chains must total at least 9; $R_2O$ is an alkoxy radical selected from the class consisting of —$C_2H_4O$— and —$C_3H_6O$— radicals; $n$ is a small whole number varying from 1 to 6; $OC.R_3$ is the acyl radical of the low molecular weight monocarboxy acid having not more than 3 carbon atoms, in which an alpha-hydrogen atom has been removed linked to the nitrogen of the radical $N:R_4$ through its alpha carbon atom; and $N:R_4$ represents a radical of a heterocyclic compound of the pyridine series selected from the group consisting of pyridine and C-linked methyl homologs of pyridine.

2. The compound of claim 1, wherein the halogen is chlorine.

3. The compound of claim 1, wherein the halogen is chlorine, and $R_3$ is the $CH_2$ radical.

4. The compound of claim 1, wherein the halogen is chlorine, $R_3$ is the $CH_2$ radical, and $n$ is 1.

5. The compound of claim 1, wherein the halogen is chlorine, $R_3$ is the $CH_2$ radical, $n$ is 1, and $R_2O$ is —$C_2H_4O$—.

6. The compound of claim 1, wherein the halogen is chlorine, $R_3$ is the $CH_2$ radical, $n$ is 1, $R_2O$ is —$C_2H_4O$—, and $N:R_4$ is a pyridinium radical.

7. The compound of claim 1, wherein the halogen is chlorine, $R_3$ is the $CH_2$ radical, $n$ is 1, $R_2O$ is —$C_2H_4O$—, $N:R_4$ is a pyridinium radical, and at least one side chain of $R_1$ is a butyl radical.

8. The compound of claim 1, wherein the halogen is chlorine, $R_3$ is the $CH_2$ radical, $n$ is 1, $R_2O$ is —$C_2H_4O$—, $N:R_4$ is a pyridinium radical, and at least one side chain of $R_1$ is an amyl radical.

9. The compound of claim 1, wherein the halogen is chlorine, $R_3$ is the $CH_2$ radical, $n$ is 1, $R_2O$ is —$C_2H_4O$—, $N:R_4$ is a pyridinium radical, and at least one side chain of $R_1$ is an octyl radical.

MELVIN DE GROOTE.
BERNHARD KEISER.

(References on following page)

REFERENCES CITED

The following references are of record in the file of this patent:

UNITED STATES PATENTS

| Number | Name | Date |
|---|---|---|
| 1,917,258 | Harris | July 11, 1933 |
| 2,023,075 | Harris | Dec. 3, 1935 |
| 2,233,381 | De Groote et al. | Feb. 5, 1941 |
| 2,299,782 | Allen et al. | Oct. 27, 1942 |
| 2,306,775 | Blair | Dec. 29, 1942 |

FOREIGN PATENTS

| Number | Country | Date |
|---|---|---|
| 452,866 | Great Britain | Aug. 4, 1936 |